E. V. GANDIL.
ADJUSTING DEVICE FOR MILKING MACHINES.
APPLICATION FILED FEB. 16, 1909.

936,771. Patented Oct. 12, 1909.

WITNESSES:

INVENTOR,
ERNST VALDEMAR GANDIL,
by
Attorney.

UNITED STATES PATENT OFFICE.

ERNST VALDEMAR GANDIL, OF COPENHAGEN, DENMARK.

ADJUSTING DEVICE FOR MILKING-MACHINES.

936,771.  Specification of Letters Patent.  Patented Oct. 12, 1909.

Application filed February 16, 1909. Serial No. 478,191.

*To all whom it may concern:*

Be it known that I, ERNST VALDEMAR GANDIL, engineer, a subject of the King of Denmark, residing at Hobrogade No. 2, Copenhagen, Denmark, have invented a new and useful Improvement in Adjusting Devices for Milking-Machines; and I do hereby declare the following to be a full, clear, and exact description of the same.

The present invention relates to an adjusting-device for milking-machines, by means of which the milking-device is adjusted in such a manner so as to be placed in the right position in relation to the teat in question.

Two modifications of the device are shown in the accompanying drawing, in which—

Figure 1:
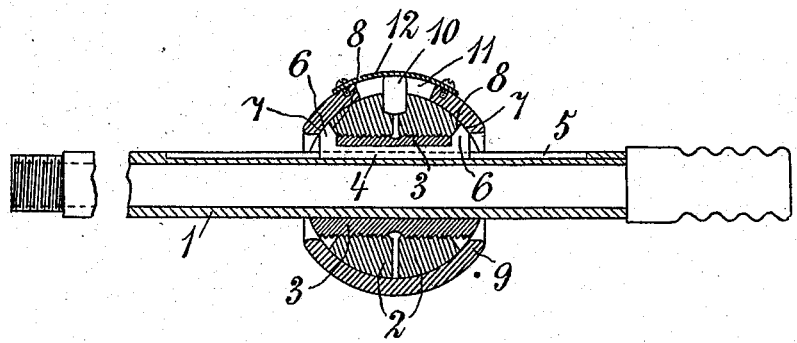
Figure 2:
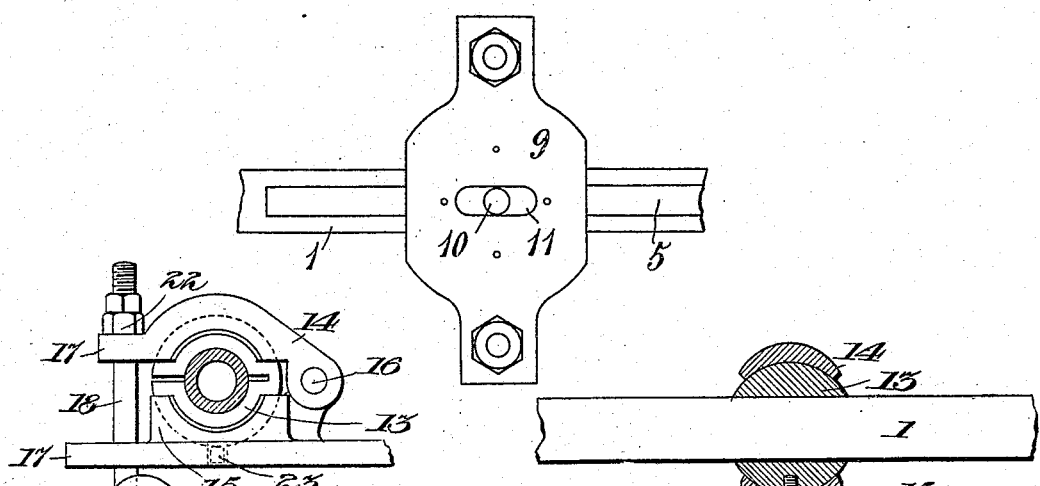
Figure 4:
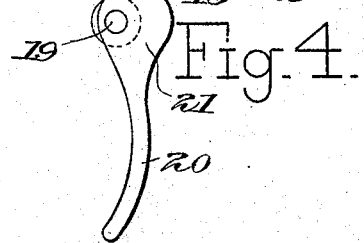
Figure 3:
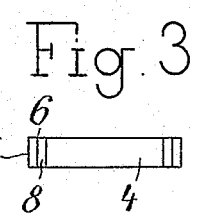
Figure 5:
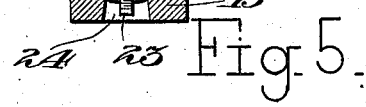

Figures 1–3 show one modification and Figs. 4 and 5 the other modification.

The pipe 1 carries in one end the milking-device, which through the pipe can be acted upon by suction or pressure. According to both modifications this pipe is led through a cylindrical hole in a divided or slashed ball, which is placed in a corresponding ball-ring, to which it can be retained in the position desired by suitable securing-devices. In the modification according to Figs. 1–3 the ball is divided into two parts by a vertical cut, each half of the ball having a cylindrical cavity, which has inside respectively left- and right hand threads. A hollow cylinder 3 is displaceably arranged on the pipe 1, the outside half of which has a right hand thread and the other half a left hand thread. On this cylinder 3 the two halves of the ball 2 are screwed. The cylinder 3 has inside at top a notch in which is arranged a pinching-die 4 reaching down into a groove 5 on the pipe 1. The pinching-die has two projections 6, which are roof-formed at top, the outer surfaces 7 forming part of a ball-surface, which fit in corresponding conical surfaces on the outside end of the two ball-halves 2. Around the ball 2 a ball-ring 9 consisting of two parts is arranged. A notch is found on the sides of the ball-half 2, opposite to each other, in which notch is loosely arranged a guiding-tap 10, which is led through a slit 11 arranged in the ball-ring 9, which slit points in the same direction as the pipe 1. In order to prevent the guiding-tap 10 from falling out a cover 12 is arranged over the slit 11. The tap 10 prevents the ball-halves 2 in turning in relation to the ball-ring 9 in the plane perpendicular to the slit 11. Such turning would namely prevent the fixing of the ball-halves.

The adjusting device is used in the following manner. When the two ball-halves 2 are led together in such a way that their exterior surfaces do not press against the interior surfaces of the ball-ring, the pipe 1 is longitudinally displaceable in the cavity of the cylinder 3, the pinching-die 4 sliding in the groove 5. The pipe can then be swung around the center of the ball 2 in the plane of the paper and in a plane perpendicular to the plane of the paper. When the adjustment is completed, the pipe 1 is turned a little around its own axis in such a direction so as to cause the ball-halves to withdraw from each other. The outer surfaces of the ball-halves will thereby be pressed against the inner surface of the ball-ring, but at same time the pinching-die 4 will be pressed down into the groove 5, on account of the surfaces 8, causing the cylinder 3 to be fixed on the pipe 1. When the ball-ring 9 is in a suitable connection with the device, by means of which the milking-machine is fastened to the animal, the milking-device is fastened to said device in a certain position.

In the modification according to Figs. 4 and 5 the pipe 1 is led through a ball 13, which is partly cut through by a horizontal cut. When the ball is not squeezed together, the pipe 1 will thus be displaceable on its longitudinal axis and turn on the same inside the ball 13, which is likewise here arranged in a ball-ring, consisting of two parts 14 and 15, which are connected by a hinge-device 16; each part of the ring carrying on opposite sides of the hinge a flange 17 with holes for a rod 18, which rod carrying at foot a bolt 19, on which an eccentric 21, provided with a handle 20, is turnable. At top the rod 18 is screw-threaded and provided with a nut 22. The ball 13 carries at foot a pin 23, reaching down in a slit 24 in the lower part 15 of the ring. When the eccentric 21 is loosely suspended as shown in Fig. 5, the ball 13 is within a certain limit turnable in any direction in the ring 14, 15. When the milking-device has attained its right position, the handle 20 is turned upward, drawing the rod 18 downward so as to cause the two parts of the ring to be pressed firmly together around the ball 13, which is thereupon squeezing the pipe 1, whereby the milking-device is retained in the desired position in a manner similar to that previously described.

Having thus described my invention, I claim as new and desire to secure by Letters Patent.

1. An adjusting device for milking-machines, consisting of a divided ball having a cylindrical channel therethrough, an encircling ball-ring and means for retaining the divided ball within the ball ring, substantially as set forth.

2. An adjusting device for milking-machines, consisting of a divided ball, a conducting pipe held by the two portions of the divided ball, a slotted ball-ring inclosing the divided ball and the pipe, a tap attached to the divided ball and working in the slotted ball-ring, in combination with means adapted to secure the ball-ring to the ball, substantially as set forth.

3. An adjusting device for milking-machines, consisting of a divided ball, an encircling ball-ring provided with a slot, a guide-tap attached to the ball, and engaging the ring-slot, substantially as set forth.

4. An adjusting device for milking-machines, consisting of a divided ball, a two-part ball-ring provided with a slot, a tap attached to the ball and engaging the ring-notch, and means for securing the ball-ring upon the divided ball, substantially as set forth.

5. An adjusting device for milking machines, consisting of a divided ball, each half having a screw-threaded cylindrical orifice, a hollow cylinder provided externally with screw-threads adapted to engage the threads on the divided ball, a conducting pipe encircled by the cylinder, a longitudinal groove in said pipe, a pinching die engaging the divided ball and the cylinder, and movable in the pipe groove, a slotted ball-ring surrounding the ball, the cylinder and the ring and adapted to hold the various parts in the proper relative position, as and for the purpose set forth.

In testimony whereof, I have signed my name to this specification in the presence of two subscribing witnesses.

ERNST VALDEMAR GANDIL.

Witnesses:
  CECIL VILHELM SCHÖN,
  VIGGO BLOM.